UNITED STATES PATENT OFFICE.

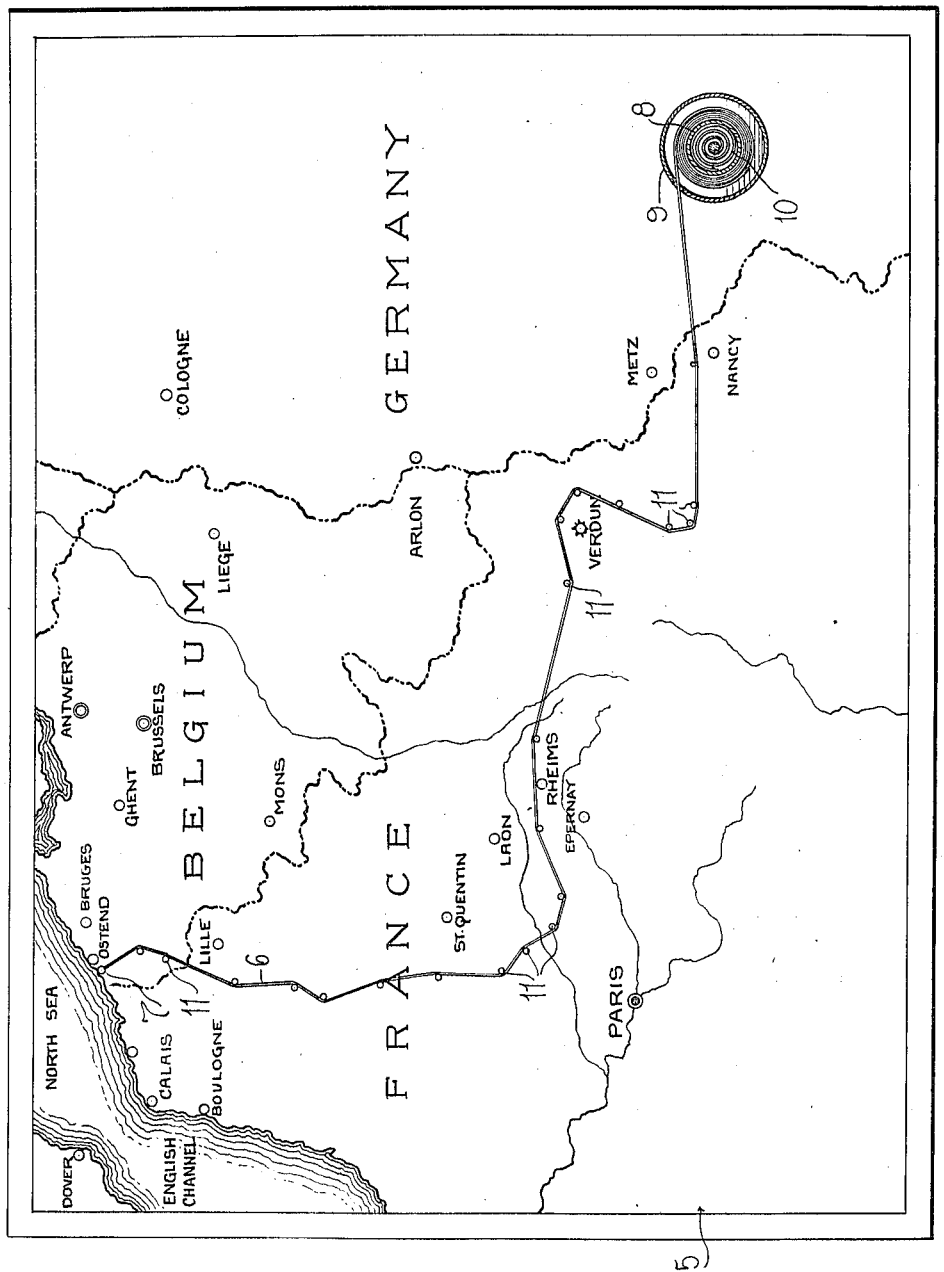

HANS GEORGE RIEMANN, OF MEADVILLE, PENNSYLVANIA.

INDICATIVE CHART.

1,293,928.     Specification of Letters Patent.     Patented Feb. 11, 1919.

Application filed June 12, 1918. Serial No. 239,693.

*To all whom it may concern:*

Be it known that I, HANS G. RIEMANN, a citizen of the United States, residing at Meadville, in the county of Crawford and State of Pennsylvania, have invented certain new and useful Improvements in Indicative Charts, of which the following is a specification, reference being had to the accompanying drawings.

This invention relates to an improved indicative chart or map, and has for its primary object to provide improved means whereby the changing battle line or front may be accurately indicated so that the chart may be kept at all times abreast of the movements of the opposing armies.

It is another and more particular object of my invention to provide a chart or map having an outline of the States in which the warring armies are operating outlined thereon, together with the towns and cities, a flexible tape fixed at one of its ends to the chart, means to which the other end of the tape is connected whereby the tape is automatically taken up and held taut, and a plurality of pins or other elements adapted to be arranged in the chart and with which said tape is engaged, whereby the position of the tape across the surface of the chart may be changed in accordance with the changes in the battle front.

It is a further general object of my invention to provide a device of the above character which is simple and inexpensive in its construction, convenient and serviceable for the purpose in view, and which may be easily and quickly operated, and is therefore very desirable for use as a public display chart by newspaper publishers.

With the above and other objects in view, the invention consists in the improved combination, construction and relative arrangement of the several parts as will be hereinafter more fully described, subsequently claimed and illustrated in the accompanying drawing, wherein I have shown a plan view of my improved war chart or map.

The base of the chart or map, shown at 5, consists of heavy cardboard, wood, metal, or other suitable material. Upon the surface of this base, the map may be directly delineated in any suitable manner or the map may be printed upon a separate paper sheet and affixed to the surface of the base. In the illustrated embodiment of my invention, I have represented the western battle front as it is commonly designated with reference to the present European war. I have, therefore, shown the State of Belgium, the northern part of France, and portions of Germany and Holland, together with the English Channel and the coast line of England. It is, however, of course apparent that a greater expanse of territory may be indicated upon the map or chart. The principal towns and cities of the several States are also accurately indicated upon the map.

A flexible cord or tape 6 of a bright, conspicuous hue or color has a pin 7 attached to one of its ends. This end of the tape may be fixed by means of the pin at any desired point upon the surface of the chart as, for instance, along the coast line of Belgium approximately at the point of the farthest southern advance of the German armies along this coast during the present war.

The other end of the tape 6 is connected to a drum 8, mounted within a suitable metal casing 9 fixed upon the surface of the chart adjacent the opposite side thereof. The drum 8 is rotated in one direction by means of a spring 10, whereby the tape 6 is wound upon said drum and normally held taut.

A plurality of pins 11 are provided, having sharp points which are adapted to be impaled in the surface of the chart. These pins are adapted to be arranged in proper spaced relation at points along the line of the battle front, and the tape is engaged around said pins, said tape contacting with the relatively opposite sides of adjacent pins, as clearly seen in the drawing. In this adjustment of the tape, it is pulled from the drum 8 so that the spring 10 will be wound, said spring thereby tending to pull the tape around the pins and holding it at all times stretched or taut. In the progress of the fighting, as the line of battle changes at different points, the pins 11 are properly adjusted so that the tape 6 will accurately indicate the latest known positions of the opposing troops.

From the foregoing description, taken in connection with the accompanying drawing, the construction, manner of operation and several advantages of my invention will be clearly and fully understood. The improved battle line indicating chart as above explained provides a very simple means, whereby the constantly changing positions of the warring armies operating through the different States or Territories may at all times be accurately indicated. The flexible tape can be very easily and quickly adjusted, and provides means which enables the casual observer to easily read the chart. The device is, therefore, well adapted for use by newspaper publishing concerns as a public information chart or bulletin, to be suitably mounted upon the wall of a building. The chart can, of course, be made of any desired size and at night the surface of the chart is suitably illuminated. However, the chart may be likewise made in smaller sizes upon wood or cardboard for individual use. I have above referred to the adjustable pins as having points to penetrate the surface of the chart, but it will also be apparent that these pins may be suitably attached to the chart in various other ways.

Accordingly, while I have herein shown and described one embodiment of the invention, it is to be understood that the device is susceptible of many modifications and I, therefore, reserve the privilege of resorting to all such legitimate changes as may be fairly embodied within the spirit and scope of the invention as claimed.

I claim:—

1. A chart of the character described having a map delineated thereon, a flexible tape provided with means at one of its ends for attaching said tape to the chart, a plurality of adjustable elements adapted to be arranged upon the surface of the chart and with which said tape is adapted to be engaged, and means to which the other end of the tape is connected for holding the tape taut and in engagement with said elements.

2. A chart of the character described having a map delineated thereon, a flexible tape provided with means at one of its ends for attaching said tape to the chart, a plurality of adjustable elements adapted to be arranged upon the surface of the chart and with which said tape is adapted to be engaged, a rotatable drum to which the other end of the tape is attached, and a spring to rotate the drum in one direction and wind the tape whereby the tape is held taut and in engagement with said elements.

3. A chart of the character described having a map delineated thereon, a flexible tape, a pin attached to one end of said tape whereby the same may be secured to the surface of the chart, additional pins adapted to be arranged in spaced relation upon the surface of the chart and with which said tape is adapted to be engaged, and means connected to the other end of the tape for holding the same taut and in contact with said pins.

4. In combination with a chart having a map delineated thereon, adjustable elements adapted to be arranged in spaced relation across the face of the chart, a drum rotatably mounted upon the chart, a flexible member having means at one end for detachable connection at its connected point to the chart and adapted to be engaged with said elements, the other end of said flexible member being attached to the drum, and a spring to rotate said drum in one direction and wind the flexible member thereon and hold the same in a taut condition in engagement with said element.

In testimony whereof I hereunto affix my signature.

HANS GEORGE RIEMANN.